United States Patent
Ashcom et al.

[11] Patent Number: 5,400,703
[45] Date of Patent: Mar. 28, 1995

[54] ROASTING PAN

[76] Inventors: Colleen K. Ashcom; James R. Ashcom, both of 151 Boyer St., Johnstown, Pa. 15906

[21] Appl. No.: 84,925
[22] Filed: Jul. 1, 1993
[51] Int. Cl.$^6$ .................. A47J 27/00; A47J 37/00
[52] U.S. Cl. .................... 99/446; 99/400; 99/450
[58] Field of Search ............. 99/339, 340, 345, 346, 99/400, 401, 410–417, 426, 444–446, 450, 449; 126/369, 373, 390; 220/912

[56] References Cited

U.S. PATENT DOCUMENTS

| 471,134 | 3/1892 | Noland | 99/446 |
|---|---|---|---|
| 693,725 | 2/1902 | Leland | 99/446 |
| 714,537 | 11/1902 | Wallace | 99/446 |
| 1,007,323 | 10/1911 | Betts | 99/446 |
| 2,204,681 | 6/1940 | Kircher | 99/446 |
| 2,569,262 | 9/1951 | Sklavenitis | 99/450 |
| 2,842,043 | 7/1958 | Reuland | 99/446 |
| 3,289,571 | 12/1966 | Lewus | 99/446 |
| 3,324,788 | 6/1967 | La France | 99/446 |
| 4,106,486 | 8/1978 | Lee | 126/369 |
| 4,840,118 | 6/1989 | Rinehart | 99/450 |

Primary Examiner—Timothy F. Simone

[57] ABSTRACT

A roasting pan especially designed to permit uniform distribution of heat and moisture therein and to provide for collecting and removing meat juices therefrom which comprises a main roasting enclosure; a removable lid for such main enclosure; a perforated H-shaped holder removably positioned within said main enclosure; and a removable liquid-impermeable drawer extending through the wall of said main enclosure and being supported on the cross member of said H-shaped holder, said removable drawer having a means at the interior end thereof to permit pouring off collected meat juices.

3 Claims, 3 Drawing Sheets

ROASTING PAN

BACKGROUND OF THE INVENTION

1. Field of the Invention

The present invention relates to cooking utensils and more particularly pertains to pans which may be used for roasting meat.

2. Description of the Prior Art

The use of roasting pans is known in the prior art. More specifically, pans heretofore devised and utilized for the purpose of roasting meat are known to consist basically of familiar, expected and obvious structural configurations, notwithstanding the myriad of designs encompassed by the crowded prior art which have been developed for the fulfillment of countless objectives and requirements. In a number of instances such pans also contain drip pans for collecting meat juices. Typical of the prior art devices are those illustrated in U.S. Pat. Nos. 5,069,117; 4,924,786; 4,848,217; and 4,557,188. In those which have drip pans, the entire pan must be removed from the stove or oven and opened to access the meat juices therein.

In this respect, the roasting pan according to the present invention substantially departs from the conventional concepts and designs of the prior art, and in so doing provides an apparatus primarily developed for the purpose of uniformly roasting meat and readily removing collected meat juices therefrom.

Therefore, it can be appreciated that there exists a continuing need for new and improved roasting pans. In this regard, the present invention substantially fulfills this need.

SUMMARY OF THE INVENTION

In view of the foregoing disadvantages inherent in the known types of roasting pans now present in the prior art, the present invention provides an improved roasting pan construction wherein the same can be utilized to uniformly roast meat and to easily collect and remove meat juices therefrom. As such, the general purpose of the present invention, which will be described subsequently in greater detail, is to provide a new and improved roasting pan which has all the advantages of the prior art pans and none of the disadvantages.

To attain this, the present invention essentially comprises a roasting pan especially designed to permit uniform distribution of heat and moisture therein and to provide for collecting and removing meat juices therefrom which comprises a main roasting enclosure; a removable lid for such main enclosure; a perforated H-shaped holder removeably positioned within said main enclosure; and a removable liquid-impermeable drawer extending through the wall of said main enclosure and being supported on the cross member of said H-shaped holder, said removable drawer having a means at the interior end thereof to permit pouring off collected meat juices.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved roasting pan which has all the advantages of the prior art pans and none of the disadvantages.

It is another object of the present invention to provide a new and improved roasting pan which may be easily and efficiently manufactured and marketed.

It is a further object of the present invention to provide a new and improved roasting pan which is of a durable and reliable construction.

An even further object of the present invention is to provide a new and improved roasting pan which is susceptible of a low cost of manufacture with regard to both materials and labor, and which accordingly is then susceptible of low prices of sale to the consuming public, thereby making such roasting pans economically available to the buying public.

Still yet another object of the present invention is to provide a new and improved roasting pan which provides in the apparatuses and methods of the prior art some of the advantages thereof, while simultaneously overcoming some of the disadvantages normally associated therewith.

Still another object of the present invention is to provide a new and improved roasting pan which permits of easy removal of meat juices therefrom.

Yet another object of the present invention is to provide a new and improved roasting pan which can easily be cleaned.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
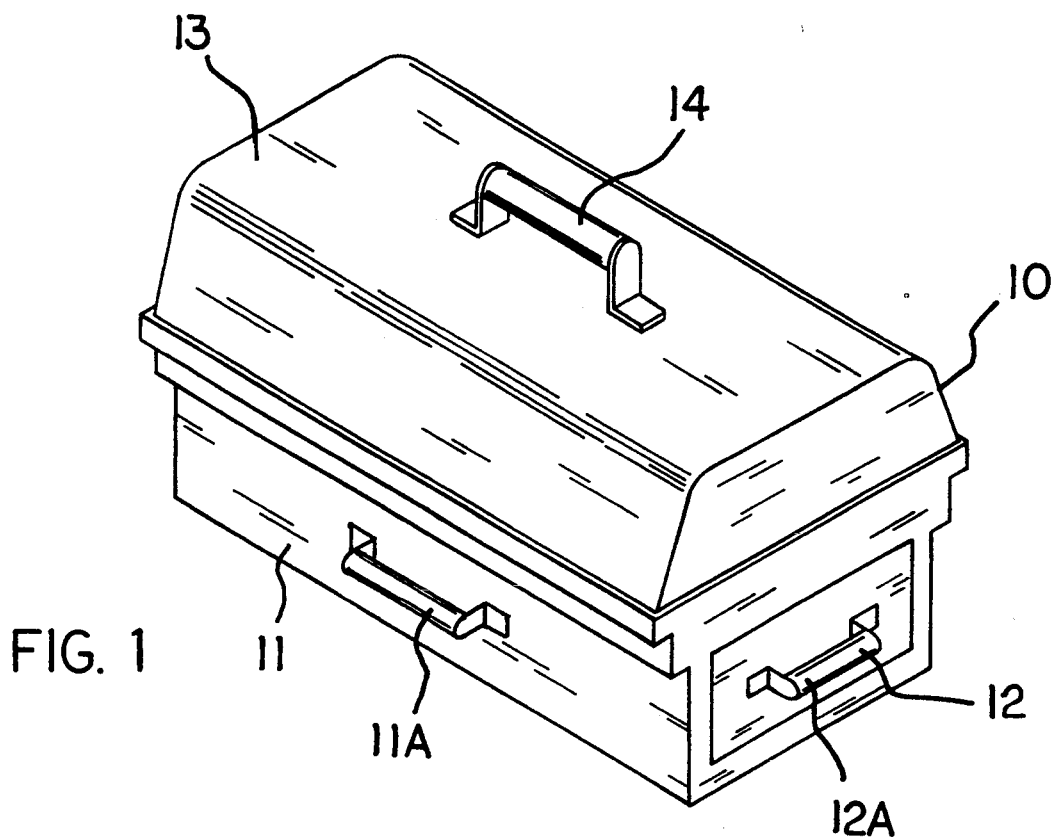
FIG. 1 is an overall perspective view of the device of the present invention.

With reference now to the drawings, and in particular to FIG. 1 thereof, a new and improved roasting pan embodying the principles and concepts of the present invention and generally designated by the reference numeral 10 will be described.

More specifically, it will be noted that the roasting pan 10 basically comprises a main enclosure portion 11 having a slideably removable drawer 12 extending therein and a raised, removable lid portion 13 thereon. Lid portion 13 has a handle member 14 to facilitate removal of lid 13. Similar handles 12A and 11A are positioned on drawer 12 and the main enclosure portion 11 to facilitate handling.

Figure 2:
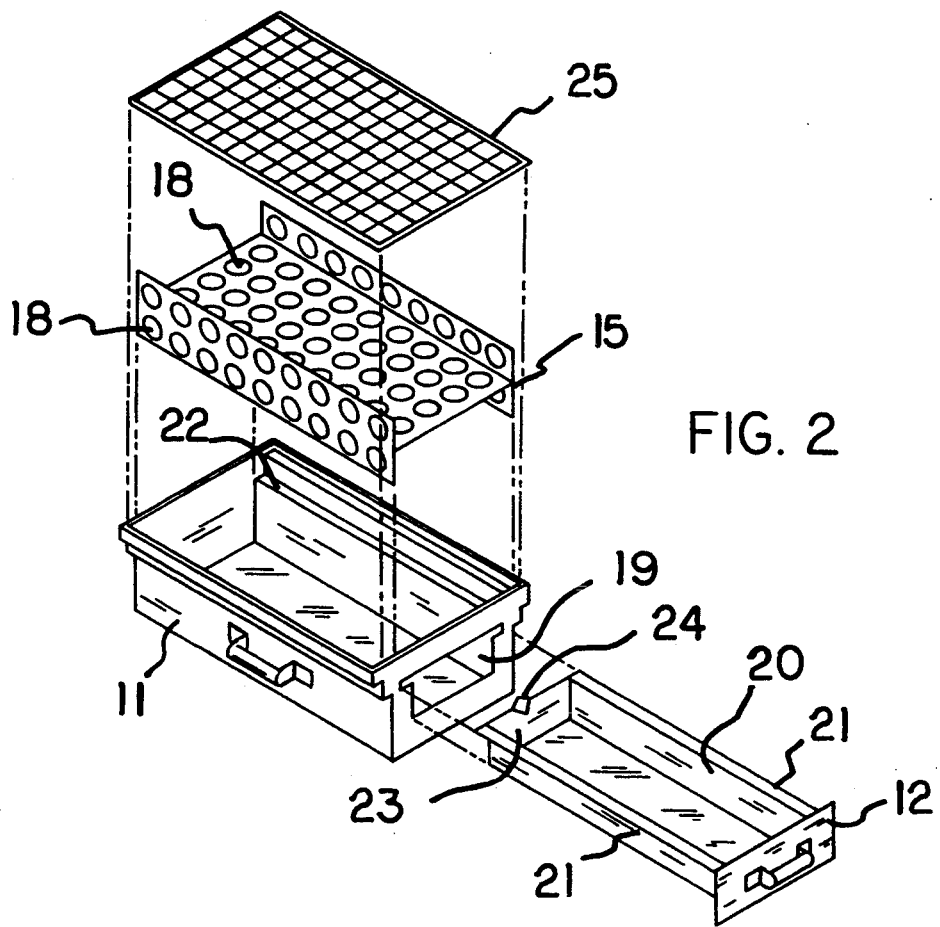
FIG. 2 is an exploded view of the internal components of the device of the present invention.

Also shown in FIG. 2, inside of the main enclosure portion 11, are three separate components. In the normal order of insertion, the first of these components is a perforated metal tray insert 15 having an H-shaped cross-section with a flat horizontally extending planar member 16 forming the cross-bar thereof and a pair of vertical side plates 17 at each side of and extending the length of said planar member 16 to form the uprights of the H-cross-section. Side plates 17 are likewise perforated. These perforations 18 allow heat and moisture to circulate uniformly throughout the main enclosure 11 when the raised lid 13 (shown in FIG. 1) is in place.

The second component is a removable drawer 12 which is adapted to fit through an opening 19 in the end of the main enclosure 11. Drawer 12 has a liquid impermeable body portion 20 and a pair of horizontal lips 21 extending longitudinally along the top of body portion 20. The bottom of drawer 12 rests upon and is supported by the planar, perforated member 16 of metal tray insert 15. Drawer 12 also has at its internal end 23 a pouring spout 24 formed in the upper surface of internal end 23 to facilitate pouring of meat juices or gravy from tray 12.

The third component is a grid or grate 25 which is superimposed within the main enclosure 11 above the tray insert 15 and drawer 12. This grid removeably rides on support ledges 22 within main enclosure 11 and serves to support the meat being roasted thereon.

Figure 3:
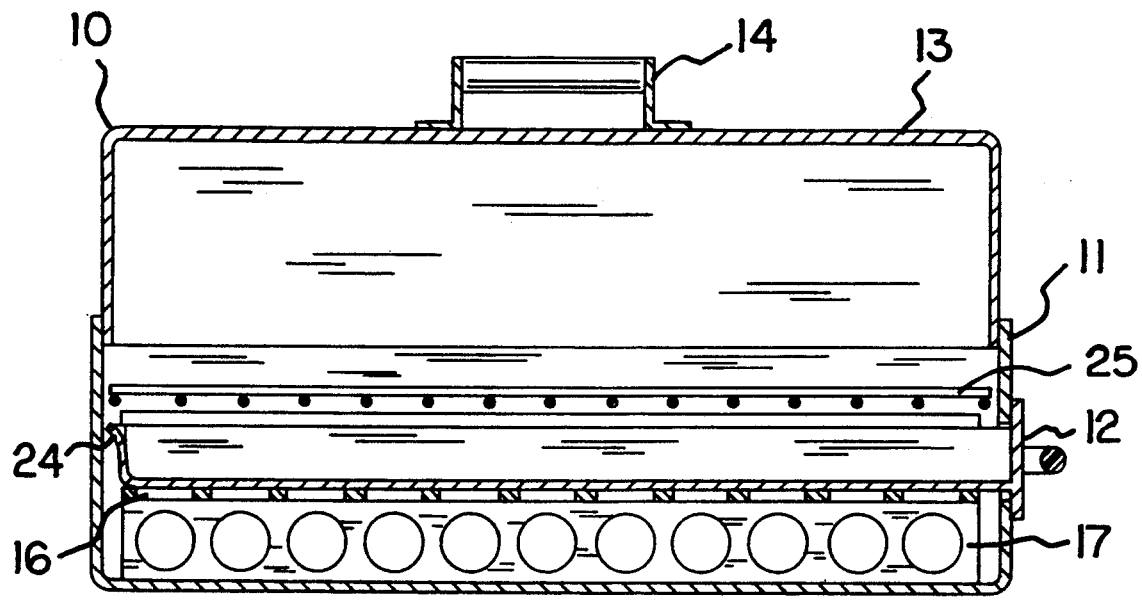
FIG. 3 is a sectional side elevation of the device of FIG. 1.
Figure 4:
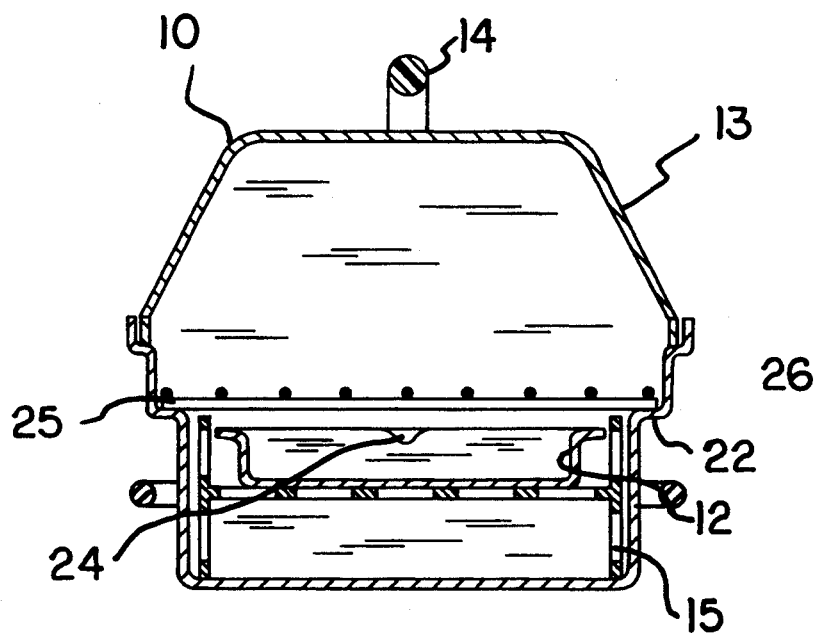
FIG. 4 is a sectional end view of such device of FIG. 1.

FIGS. 3 and 4 show the components of FIG. 2 in place within the roasting pan 10 and additionally illustrate the supporting ledges 26 formed in the main enclosure body 11 to hold the lower edges of lid 13 in place on such main enclosure body 11.

Figure 5:
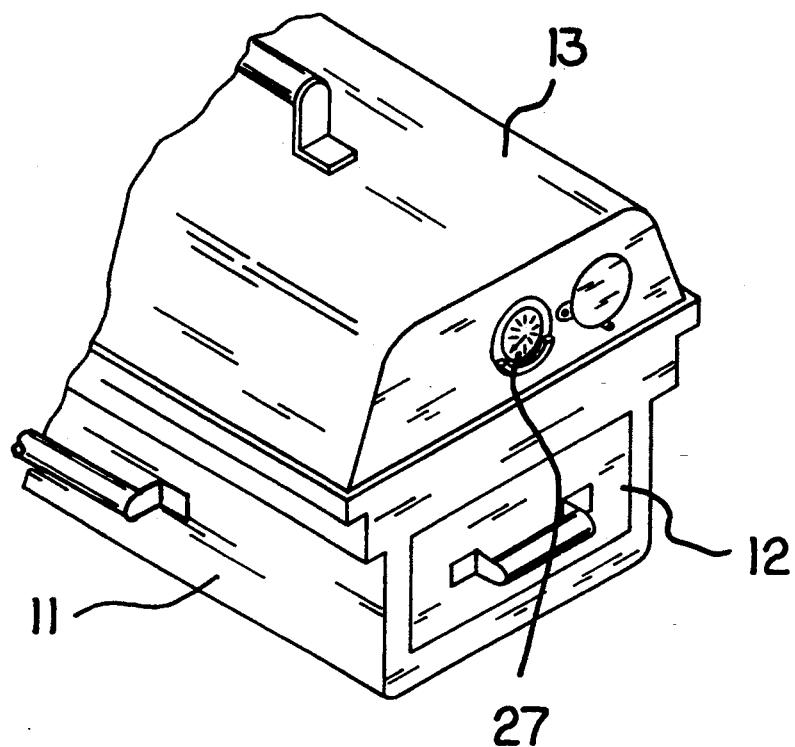
FIG. 5 and 6 illustrate a modification to the device of the previous Figures.
Figure 6:
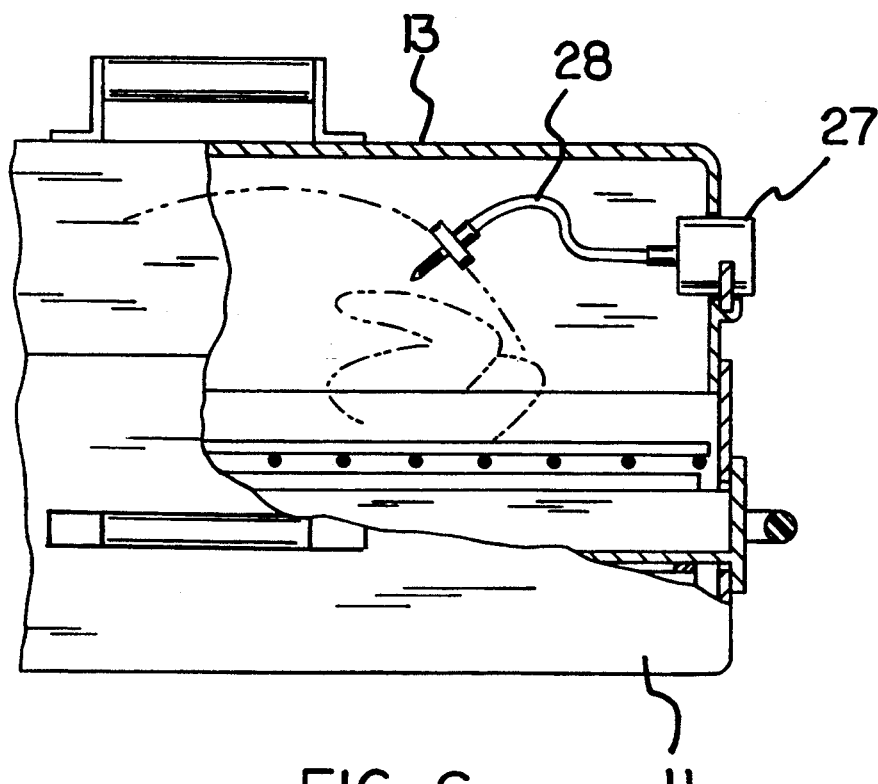

FIGS. 5 and 6 illustrate the addition of a meat temperature registering thermometer 27 mounted on lid member 13 with a meat temperature sensing probe 28 connected thereto and adapted to be inserted into the meat being roasted (shown in broken lines).

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved roasting pan which comprises: a main roasting enclosure; a removable lid for such main enclosure; a perforated H-shaped holder removeably positioned within said main enclosure; a grill member positioned above said H-shaped holder and means positioned on and in association with said H-shaped holder to catch and retain meat juices dropping from said grill, said means being removable from said main enclosure while said lid remains in place.

2. A roasting pan as in claim 1 wherein said means comprises a slidable liquid collecting drawer resting upon the cross member of said H-shaped holder and extending through said main enclosure so as to be removable therefrom.

3. A roasting pan as in claim 1 wherein means are provided to obtain and register the internal temperature of meat being roasted therein.

* * * * *